(12) United States Patent
Oh et al.

(10) Patent No.: US 7,567,625 B2
(45) Date of Patent: Jul. 28, 2009

(54) APPARATUS AND METHOD FOR SUB-CARRIER ALLOCATION IN A MULTIPLE-INPUT AND MULTIPLE-OUTPUT (MIMO) ORTHOGONAL FREQUENCY DIVISION MULTIPLEXING (OFDM) COMMUNICATION SYSTEM

(75) Inventors: Hyun-Seok Oh, Incheon (KR); Hyun-Seok Yu, Seoul (KR); Hye-Jeong Lee, Suwon-si (KR); Gin-Kyu Choi, Seoul (KR); Yong-Suk Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 610 days.

(21) Appl. No.: 10/984,802

(22) Filed: Nov. 10, 2004

(65) Prior Publication Data
US 2005/0099937 A1 May 12, 2005

(30) Foreign Application Priority Data
Nov. 12, 2003 (KR) ............... 10-2003-0079941

(51) Int. Cl.
H04L 27/00 (2006.01)
H04K 1/02 (2006.01)
(52) U.S. Cl. ............... 375/299; 375/295; 375/296; 375/297
(58) Field of Classification Search ............... 375/260, 375/295, 316, 296, 297, 298, 299
See application file for complete search history.

(56) References Cited

U.S. PATENT DOCUMENTS 5,719,898 A * 2/1998 Davidovici et al. ......... 375/130
6,131,016 A 10/2000 Greenstein et al. ........... 455/69
6,751,444 B1 * 6/2004 Meiyappan ................... 455/69
6,834,043 B1 * 12/2004 Vook et al. ................... 370/310
6,891,880 B2 * 5/2005 Abraham ..................... 375/142
6,961,388 B2 * 11/2005 Ling et al. ................... 375/267
7,039,120 B1 * 5/2006 Thoumy et al. .............. 375/275

(Continued)

FOREIGN PATENT DOCUMENTS

JP 11-027231 1/1999

(Continued)

OTHER PUBLICATIONS

Cheong Yui Wong et al.; Multi-user OFDM with Adaptive Sub-carrier, Bit, and Power Allocation; IEEE Journal On Selected Areas In Communications; vol. 17, No. 10, Oct. 1999; pp. 1747-1758.

Primary Examiner—Jason M. Perilla
(74) Attorney, Agent, or Firm—Roylance, Abrams, Berdo & Goodman, L.L.P.

(57) ABSTRACT

An apparatus and a method capable of effectively allocating sub-carriers for a plurality of users and transmitting the sub-carriers to users through multiple antennas in an orthogonal frequency division multiplexing (OFDMA) mobile communication system are provided. A sub-carrier allocation method reduces transmission power by taking a desired bit rate and power budget into consideration. The sub-carriers are optimally allocated to each antenna, so that peak to average power ratio (PARR) is reduced and Quality of Service (QoS) is improved. The apparatus and the method are adaptable for multi-users and obtain space diversity gain through multiple antennas.

20 Claims, 8 Drawing Sheets

U.S. PATENT DOCUMENTS

| | | | |
|---|---|---|---|
| 7,042,957 B1* | 5/2006 | Zirwas | 375/295 |
| 7,058,134 B2* | 6/2006 | Sampath | 375/260 |
| 7,200,177 B2* | 4/2007 | Miyoshi | 375/260 |
| 7,242,722 B2* | 7/2007 | Krauss et al. | 375/260 |
| 2002/0001352 A1* | 1/2002 | Stirling-Gallacher et al. | 375/260 |
| 2003/0043928 A1* | 3/2003 | Ling et al. | 375/267 |
| 2003/0072382 A1 | 4/2003 | Raleigh et al. | 375/267 |
| 2003/0128658 A1* | 7/2003 | Walton et al. | 370/208 |
| 2003/0169824 A1* | 9/2003 | Chayat | 375/260 |
| 2003/0235255 A1* | 12/2003 | Ketchum et al. | 375/285 |
| 2004/0141566 A1* | 7/2004 | Kim et al. | 375/267 |
| 2004/0208232 A1* | 10/2004 | Sudo | 375/146 |
| 2005/0031047 A1* | 2/2005 | Maltsev et al. | 375/260 |
| 2005/0047517 A1* | 3/2005 | Georgios et al. | 375/267 |
| 2005/0084000 A1* | 4/2005 | Krauss et al. | 375/148 |
| 2005/0085236 A1* | 4/2005 | Gerlach et al. | 455/450 |
| 2005/0089109 A1* | 4/2005 | Yun et al. | 375/260 |
| 2005/0152465 A1* | 7/2005 | Maltsev et al. | 375/260 |
| 2005/0152466 A1* | 7/2005 | Maltsev et al. | 375/260 |
| 2005/0233709 A1* | 10/2005 | Gardner et al. | 455/101 |
| 2005/0276336 A1* | 12/2005 | Khan | 375/260 |
| 2005/0281242 A1* | 12/2005 | Sutivong et al. | 370/344 |
| 2005/0286611 A1* | 12/2005 | Priotti | 375/144 |
| 2006/0008014 A1* | 1/2006 | Tamaki et al. | 375/260 |
| 2006/0146755 A1* | 7/2006 | Pan et al. | 370/334 |

FOREIGN PATENT DOCUMENTS

| | | |
|---|---|---|
| JP | 2001-238269 | 8/2001 |
| WO | 02/49305 | 6/2002 |
| WO | 02/49306 | 6/2002 |
| WO | WO 02/062002 A1 | 8/2002 |

* cited by examiner

APPARATUS AND METHOD FOR SUB-CARRIER ALLOCATION IN A MULTIPLE-INPUT AND MULTIPLE-OUTPUT (MIMO) ORTHOGONAL FREQUENCY DIVISION MULTIPLEXING (OFDM) COMMUNICATION SYSTEM

PRIORITY

This application claims the benefit under 35 U.S.C. 119(a) of an application entitled "Apparatus And Method For Sub-Carrier Allocation In MIMO OFDM Communication system" filed with the Korean Intellectual Property Office on Nov. 12, 2003 and assigned Serial No. 2003-79941, the entire contents of which are incorporated herein by reference.

BACKGROUND OF THE INVENTION

1. Field of the Invention

The present invention relates to a mobile communication system. More particularly, the present invention relates to an apparatus and a method for allocating sub-carriers in a multi-input multi-output (MIMO) orthogonal frequency division multiplexing (OFDM) mobile communication system.

2. Description of the Related Art

Since the development of a cellular wireless mobile telecommunication system in the United States at the end of the 1970's, voice communication service has been provided to users through an advanced mobile phone service (AMPS) system, which is a $1^{st}$ generation (1G) analog type mobile communication system. Then, a 2G mobile communication system was developed in the middle of the 1990's. In addition, an International Mobile Telecommunication-2000 (IMT-2000), which is a 3G mobile communication system, was suggested at the end of the 1990's for the purpose of providing high-speed data services. Recently, IMT-2000 services have been partially provided to users.

Currently, the 3G mobile communication system is evolving into a 4G mobile communication system. Apart from previous mobile communication systems providing wireless communication services exclusively, the 4G mobile communication system may provide integrated wired/wireless communication services by effectively combining a wireless communication network with a wired communication network. To accomplish this, techniques for transmitting high-speed data services in the 4G mobile communication system are now being standardized.

When a signal is transmitted through a wireless channel in the above mobile communication systems, the transmitted signal is subject to multipath interference due to various obstacles existing between a transmitter and a receiver. Characteristics of the wireless channel having multipaths are determined by a maximum delay spread and a transmission period of a signal. If the transmission period of the signal is longer than the maximum delay spread, interference may not occur between continuous signals and a frequency characteristic of a channel is determined as frequency nonselective fading.

However, if a single carrier scheme is used when transmitting high-speed data having a short symbol interval, intersymbol interference may increase, causing signal distortion. Thus, the complexity of an equalizer at a receiving terminal may increase.

To solve the above problem of the single carrier scheme, an orthogonal frequency division multiplexing (OFDM) scheme has been suggested. According to the OFDM scheme, a multi-carrier is used to transmit data. The OFDM scheme is a type of a multi carrier modulation (MCM) scheme, in which serial symbol arrays are converted into parallel symbol arrays, which are modulated into a plurality of sub-carriers, that is, a plurality of sub-carrier channels which are orthogonal to each other.

A system employing the above MCM scheme has been adopted in a military HF radio for the first time at the end of the 1950's. In addition, the OFDM scheme for overlapping a plurality of orthogonal sub-carriers has been under development since the end of the 1970's. However, it is very difficult to realize orthogonal modulation between multi-carriers, so there is a limitation for directly applying the OFDM scheme to an actual system. In 1971, Weinstein et al. announced that modulation/demodulation using the OFDM scheme can be effectively performed by using Discrete Fourier Transform (DFT). From this point, techniques for the OFDM scheme have been rapidly developed. In addition, as a guard interval scheme and a cyclic prefix (CP) guard interval insertion scheme have been introduced, negative influences of the multipaths and delay spread upon a system can be further reduced.

Thus, recently, the OFDM scheme has been widely applied to digital transmission techniques such as digital audio broadcasting (DAB), wireless local area network (WLAN), and wireless asynchronous transfer mode (WATM). That is, the OFDM scheme, which is rarely used due to its complexity of hardware, can be adopted in the actual system as digital signal processing techniques, such as Fast Fourier Transform (FFT) and Inverse Fast Fourier Transform (IFFT), have been developed.

The OFDM scheme is similar to an Frequency Division Multiplexing (FDM) scheme. Among other things, the OFDM scheme transmits a plurality of sub-carriers while maintaining orthogonality therebetween, thereby obtaining an optimum transmission efficiency when transmitting high-speed data. In addition, since the OFDM scheme has superior frequency utilization and represents superior endurance against multipath fading, it may obtain optimum transmission efficiency when transmitting high-speed data.

In addition, since the OFDM scheme uses overlapping frequency spectrums, it can obtain superior frequency utilization. Furthermore, the OFDM scheme represents superior resistance against frequency selective fading and multipath fading, reduces an affect of Intersymbol interference (ISI) by using a guard interval, simplifies a structure of an equalizer, and reduces impulse-type noise. Thus, the OFDM scheme is positively utilized in a communication system.

Hereinafter, a structure of a communication system employing a conventional OFDM scheme will be described with reference to FIG. 1.

Figure 1:
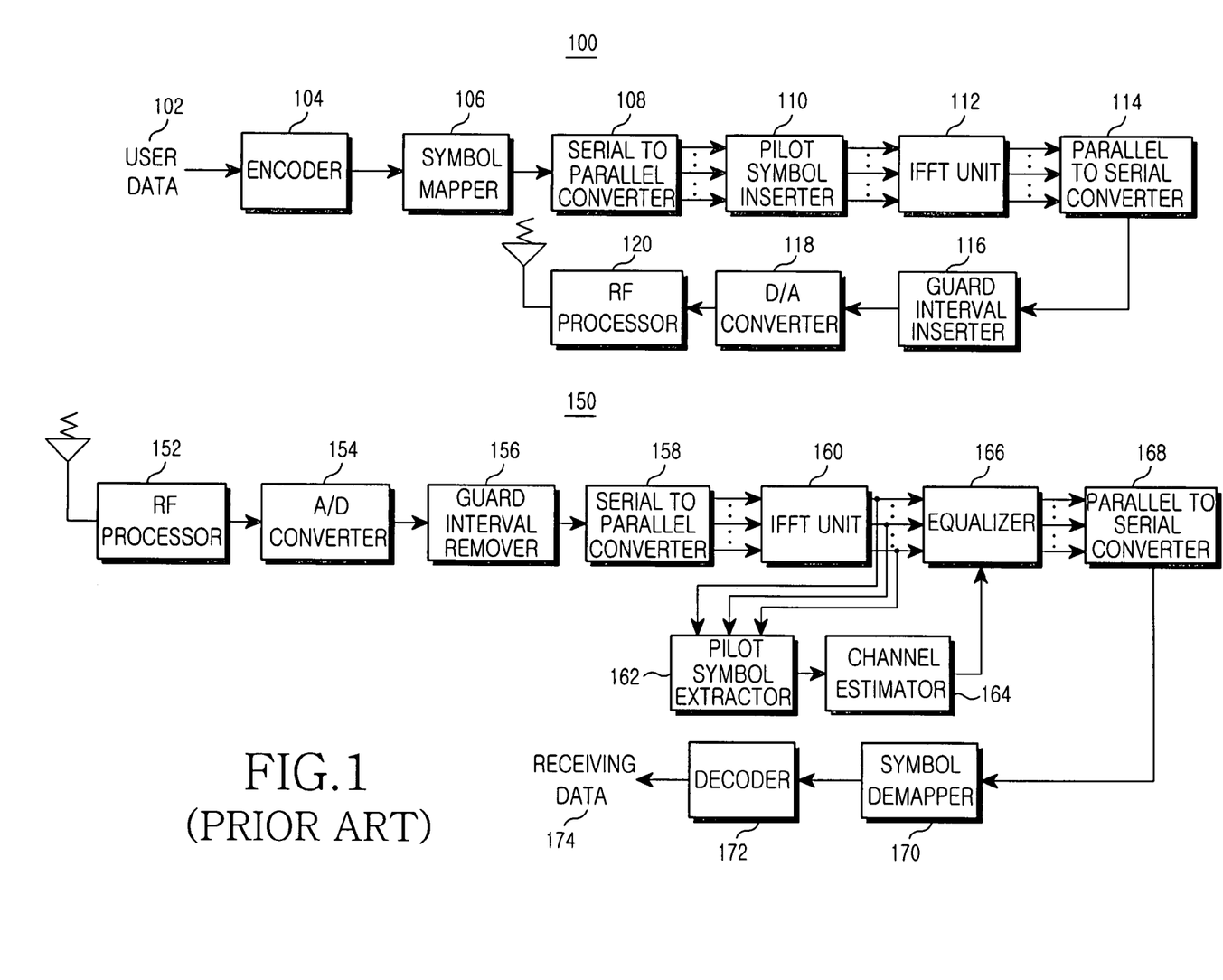
FIG. 1 is a block diagram illustrating a structure of a transceiver of a conventional orthogonal frequency division multiplexing (OFDM) system.

FIG. 1 is a view illustrating a transmitter of a conventional OFDM mobile communication system. The OFDM mobile communication system includes a transmitter 100 and a receiver 150.

The transmitter 100 includes an encoder 104, a symbol mapper 106, a serial to parallel converter 108, a pilot symbol inserter 110, an IFFT unit 112, a parallel to serial converter 114, a guard interval inserter 116, a digital to analog converter 118, and a radio frequency (RF) processor 120.

In the transmitter 100, user data 102 with user data bits and control data bits are output to the encoder 104. Upon receiving the user data 102, the encoder 104 codes user data 102 through a predetermined coding scheme and sends the data to the symbol mapper 106. Herein, the encoder 104 may code the user data 102 through a turbo coding scheme or a convolution coding scheme having a predetermined coding rate. The symbol mapper 106 modulates coded bits through a predetermined modulation scheme, thereby generating modulated symbols and sending the modulated symbols to the serial to parallel converter 108. Herein, the predetermined modulation scheme includes a binary phase shift keying (BPSK) scheme, a quadrature phase shift keying (QPSK) scheme, a quadrature amplitude modulation (16 QAM) scheme, or a quadrature amplitude modulation (64 QAM) scheme.

Upon receiving the serial modulated symbols from the symbol mapper 106, the serial to parallel converter 108 converts the serial modulated symbols into parallel modulated symbols and sends the parallel modulated symbols to the pilot symbol inserter 110. Thus, the pilot symbol inserter 110 inserts pilot symbols into the parallel modulated symbols and sends the parallel modulated symbols having the pilot symbols to the IFFT unit 112. Upon receiving signals from the pilot symbol inserter 110, the IFFT unit 112 performs N-point IFFT with respect to the signals and sends the signals to the parallel to serial converter 114.

Upon receiving the signals from the IFFT unit 112, the parallel to serial converter 114 converts the signals into serial signals and sends the serial signals to the guard interval inserter 116. The guard interval inserter 116, which has received the serial signals from the parallel to serial converter 114, inserts guard interval signals into the serial signals and sends the signals to the digital to analog converter 118. Insertion of the guard interval is necessary to remove interference between an OFDM symbol transmitted during a previous symbol transmission duration and an OFDM symbol to be transmitted in the present OFDM symbol transmission duration when OFDM signals are transmitted from an OFDM communication system. Such a guard interval has been suggested in such a manner that null data are inserted in the guard interval with a predetermined interval. However, when the null data are transmitted into the guard interval, if the receiver erroneously estimates a start point of the OFDM symbol, interference between sub-carriers may occur so that the probability of misjudgment for the received OFDM symbol may increase. Thus, a "cyclic prefix" scheme, in which predetermined last bits of an OFDM symbol in a time domain are copied and inserted into an effective OFDM symbol, or a "cyclic postfix" scheme, in which predetermined first bits of an OFDM symbol in a time domain are copied and inserted into an effective OFDM symbol, is used.

Upon receiving signals from the guard interval inserter 116, the digital to analog converter 118 converts the signal into an analog signal and sends the analog signal to the RF processor 120. The RF processor 131 includes a filter and a front end unit. The RF processor 131 transmits the signal output from the digital to analog converter 118 to air through a Tx antenna after RF-processing the signal.

Hereinafter, a structure of the receiver 150 will be described. The structure of the receiver 150 is reverse to the structure of the transmitter 100.

The receiver 150 includes an RF processor 152, an analog to digital converter 154, a guard interval remover 156, a serial to parallel converter 158, an IFFT unit 160, a pilot symbol extractor 162, a channel estimator 164, an equalizer 166, a parallel to serial converter 168, a symbol demapper 170, a decoder 172 and a data receiver 174.

First, noise is added to the signal transmitted from the transmitter 100 while the signal is being passed through a multipath channel. Then, the signal is transmitted to the receiver 150 through a reception antenna. The signal received through the reception antenna is input into the RF processor 152. The RF processor 152 down-converts the signal received through the reception signal such that the signal has an intermediate frequency band and sends the signal to the analog to digital converter 154. The analog to digital converter 154 converts the analog signal of the RF processor 152 into a digital signal and sends the digital to the guard interval remover 156.

Upon receiving the digital signal from the analog to digital converter 154, the guard interval remover 156 removes the guard interval signals and sends serial signals to the serial to parallel converter 158. The serial to parallel converter 158, which received the serial signals from the guard interval remover 156, converts the serial signals into parallel signals and sends the parallel signals to the IFFT unit 160. The IFFT unit 160 performs an N-point IFFT with respect to the parallel signals output from the guard interval remover 156 and sends the signals to the equalizer 166 and the pilot symbol extractor 162. Upon receiving the signals from the FFT unit 160, the equalizer 166 performs channel equalization with respect to the signals and sends the signals to the parallel to serial converter 168. The parallel to serial converter 168 converts the parallel signals into serial signals and sends the serial signals to the symbol demapper 170.

In the meantime, the signal output from the IFFT unit 160 is input into the pilot symbol extractor 162 so that the pilot symbol extractor 162 detects pilot symbols from the signals of the IFFT unit 160. The pilot symbols detected by the pilot symbol extractor 162 are sent to the channel estimator 164. Thus, the channel estimator 164 performs channel estimation by using the pilot symbols output from the pilot symbol extractor 162 and sends the channel estimation result to the equalizer 166. In addition, the receiver 150 generates channel quality information (CQI) corresponding to the channel estimation result and sends the CQI to the transmitter 100 through a CQI transmitter (not shown).

The symbol demapper 170 demodulates the signals output from the parallel to serial converter 168 through a predetermined demodulation scheme and sends the decoded signals to the decoder 172. Upon receiving the demodulated signal from the symbol demapper 170, the decoder 172 decodes the demodulated signals through a predetermined decoding scheme, and then, outputs the demodulated signals. The demodulation and decoding schemes employed in the receiver 150 correspond to the modulation and coding schemes employed in the transmitter 100.

Recently, the OFDM scheme has been actively studied as a representative communication scheme for a 4G mobile communication system and a next generation communication system. As described above, the OFDM uses a plurality of sub-carriers having orthogonality in order to improve frequency utilization, employs Inverse Fast Fourier Transform and Fast Fourier Transform (FFT) so as to easily process high-speed data, and utilizes a "cyclic prefix" in order to improve endurance against multi-path fading. In addition, the OFDM scheme is applicable for a multiple-input and multiple-output (MIMO) system.

The OFDM scheme used for a single user is different from the OFDM scheme used for a plurality of users. The OFDM scheme used for a plurality of users must allocate sub-carriers such that the sub-carriers do not overlap each other while taking the transmission rate and transmission power per each user into consideration. Thus, various sub-carrier allocation methods have been suggested for the OFDM schemes. One of the methods is to minimize total transmission power while using a bit rate for each user as a constraint by using an algorithm based on a Lagrange optimization method. However, although the Lagrange optimization method can attain an optimal solution, it is complex and has a low convergence speed.

In order to obtain faster speeds, a two-step sub-carrier allocation scheme has been suggested, in which the number of sub-carriers and transmission power to be allocated to each user are determined and the sub-carriers are allocated to each user such that a maximum data transmission rate can be obtained. At this time, a Hungarian algorithm is used for the sub-carrier allocation, resulting in complexity even if the number of users is small. Besides, a water-filling algorithm is used for multi-users.

There is a limitation to obtaining an optimal antenna diversity gain from a single antenna structure as shown in FIG. 1. Thus, a diversity scheme using multiple antennas has been proposed. A transmit diversity scheme using multiple antennas includes an open-loop scheme and a closed-loop scheme. The open-loop scheme has no feedback information and includes a space-time scheme including a space-time block code (STBC), a space-time trellis code (STTC) and a layered space-time code. The closed-loop scheme has feedback information and includes a transmit antenna array scheme in which each antenna transmits sub-carriers while adding a weight to sub-carriers by calculating the weight based on channel information of the signal transmitted through the antenna.

An antenna selective transmit diversity scheme can be utilized in relation to the open/closed loop schemes. In a case of the open-loop scheme, the same number of sub-carriers is allocated to each antenna. For instance, if two antennas are provided, odd sub-carriers are allocated to the first antenna and even sub-carriers are allocated to the second antenna. In a case of the closed-loop, the sub-carrier is allocated to an antenna having a superior channel characteristic by using channel information of the antennas, so the same number or a different number of sub-carriers is allocated to each channel.

Various algorithms have been suggested for allocating sub-carriers in the OFDM scheme. However, such algorithms are applicable only for a single antenna structure and target two-dimensional (time-space) resource allocation. Studies for a three-dimensional (time-frequency-space) resource allocation algorithm under a real multiple antenna environment are rarely performed. In addition, when allocating sub-carriers to the antenna through the OFDM scheme, the single antenna structure is necessary to use a plurality of sub-carriers for one antenna so a peak to average power ratio (PARR) may increase.

If the PARR increases, the complexity of an analog to digital converter (ADC) and a digital to analog converter (DAC) also increases and an efficiency of a radio frequency power amplifier may be reduced. A coding scheme and a clipping scheme are proposed in order to reduce the PARR. However, not only is it difficult to find a code capable of reducing the PARR in relation to a plurality of sub-carriers, but also interference between an in-band frequency and an out-of-band frequency may increase. In addition, multiple antennas can be used to reduce the PARR. If the same number of sub-carriers is allocated to each antenna, the PARR can be reduced in a ratio of 10 log N/n with respect to N sub-carriers, herein N is a number of sub-carriers and n is a number of antennas. However, it is necessary to effectively adjust the number of sub-carriers when the sub-carriers are allocated to each antenna.

In the meantime, transmission power must be considered in the OFDM scheme in addition to the PARR. Under the multi-user environment, power of the sub-carrier allocated to each user must be properly adjusted in order to reduce interference between users. Since the open-loop scheme of the transmit diversity method does not receive feedback information from a receiving terminal, an overhead may not occur. However, it is necessary to transmit the sub-carrier to an antenna even in an inferior channel state of the antenna, so performance degradation may occur. The closed-loop scheme allocates the sub-carrier to each antenna based on a channel state of the antenna so the closed-loop scheme represents superior performance. However, the closed-loop scheme may induce overhead due to feedback information thereof, so it is necessary to reduce the overhead. In addition, the closed-loop scheme optimizes transmission power by using a variety of channel estimation information, so a complex algorithm is required. In particular, the Lagrange optimization algorithm represents complexity which is almost impossible to realize in an actual system. In addition, various simplified sub-optimal algorithms have been suggested, but unnecessarily require overlapping loops and a plurality of sorting operations.

SUMMARY OF THE INVENTION

Accordingly, the present invention has been made to solve the above-mentioned problems occurring in the prior art, and an object of the present invention is to provide an apparatus and a method capable of effectively allocating sub-carriers for a plurality of users and transmitting the sub-carriers to users through multiple antennas in an orthogonal frequency division multiplexing (OFDMA) mobile communication system.

In order to accomplish the object, there is provided an apparatus and method for allocating a plurality of sub-carriers to at least one user equipment and mapping the allocated sub-carriers with one of a plurality of antennas in a multi-input multi-output (MIMO) OFDMA mobile communication system. The apparatus and method comprise receiving channel information related to the sub-carriers regarding the antennas from a plurality of user equipments; determining a number of sub-carriers to be allocated to each user equipment based on the channel information; and allocating sub-carriers to each user equipment and transmit antennas according to the channel information and the number of sub-carriers.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS

Hereinafter, embodiments of the present invention will be described with reference to the accompanying drawings.

In the following detailed description, representative embodiments of the present invention will be described. In addition, a detailed description of known functions and configurations incorporated herein will be omitted for conciseness.

The embodiments of the present invention provide an algorithm for effectively allocating a sub-carrier to each antenna and each user in a multi-input multi-output (MIMO) orthogonal frequency division multiplexing (OFDM) system. A system for allocating a sub-carrier according to the present invention can reduce transmission power and peak to average power ratio (PARR), satisfying a user's demand for quality of service).

In addition, the OFDMA scheme used, which is a type of OFDM schemes for a plurality of users, must allocate different sub-carriers for each user. However, one sub-carrier can be determined as an optimum sub-carrier for a plurality of users.

Accordingly, the optimum number of sub-carriers and total transmission power based on a bit rate required by each user and channel information is determined in an embodiment of the present invention, and then, the sub-carriers are allocated to each user. In addition, an embodiment of the present invention provides a MIMO OFDMA system capable of effectively allocating the sub-carriers depending on a channel environment of an antenna, thereby reducing PARR and improving frequency utilization.

In order to select sub-carriers allocated to each user and optimum antennas, channel information of each sub-carrier transmitted through the antennas is required. The channel information is calculated at a receiving terminal and sent to a transmission terminal through a feedback channel. If a large number of sub-carriers are transmitted to the transmission terminal, calculation for the feedback information, reliability for the feedback information, and delay of a feedback path must be considered.

In addition, a sub-carrier allocation algorithm in an adaptive sub-carrier allocation (ASA) scheme of a closed-loop transmit diversity is provided in an embodiment of the present invention. According to the ASA scheme, the channel information of the sub-carriers is transmitted to the transmission terminal through the feedback channel, and then, the sub-carrier is allocated to each antenna according to the sub-carrier allocation algorithm by considering the antenna selective transmit diversity.

Embodiment 1

According to a first embodiment of the present invention, channel information for all sub-carriers in antennas is obtained before a user signal is transmitted. Then, the user signal is transmitted by using the channel information. In addition, the channel information is fed back after a predetermined time lapse for the sake of channel state variation. At this time an amount of the channel information is M×N, in which M is the number of antennas, and N is the number of sub-carriers.

Prior to explaining the sub-carrier allocation algorithm according to the first embodiment of the present invention, the channel information which needs to be sent from each user equipment to a base station for sub-carrier allocation will be described.

According to the first embodiment of the present invention, the number $n_k$ of sub-carriers to be allocated to each user in OFDMA scheme is determined. Then, sub-carriers to be allocated to each user are determined through a bit loading algorithm. When the OFDMA scheme is applied to the MIMO system, the sub-carriers to be allocated to each antenna are determined through the bit loading algorithm. At this time, the number of sub-carriers and transmission power to be allocated to each user may be determined by taking a minimum bit rate $B_{min}(k)$ required by each user and an average channel gain to noise ratio (CNR) $u_k$ between each antenna and each user into consideration.

The CNR (that is, $U_k$) of channels are represented as Equation 1:

$$\mu_k = \frac{1}{M}\frac{1}{N}\sum_{m=1}^{M}\sum_{n=1}^{N}\Phi_{k,m,n} \qquad \text{Equation 1}$$

In Equation 1, M is the number of antennas, N is the number of sub-carriers, and $\Phi_{k,m,n}$ is CNR when an $n^{th}$ sub-carrier passes through a channel between a $k^{th}$ antenna and an $m^{th}$ antenna.

In addition, if a symbol error rate with respect to a user k is $P_e(k)$, and a signal to noise ratio (SNR) gap is $\gamma_e$, the SNR gap (that is, $\gamma_e$) and the CNR (that is, $\Phi_{k,m,n}$) are represented as Equations 2 and 3.

$$\gamma_k = \frac{1}{3}\left[Q^{-1}\left(\frac{P_e(k)}{4}\right)\right]^2 \qquad \text{Equation 2}$$

$$\Phi_{k,n,m} = \frac{|H_{k,m,n}|^2}{\gamma_k \sigma_{n,m}^2} \qquad \text{Equation 3}$$

In Equation 3, $H_{k,n,m}$ is a channel gain coefficient for a $k^{th}$ user, an $n^{th}$ sub-carrier, and an $m^{th}$ antenna, and $\sigma^2_{n,m}$ is noise power for an $n^{th}$ sub-carrier through an $m^{th}$ antenna. Since the transmitter obtains the CNR from each user through a feedback channel in an ASA scheme, the CNR can be obtained for all channels. Therefore, if the number of users is K, an amount of channel information received from all users is K×M×N. The sub-carrier to be allocated to each user is determined through the sub-carrier allocation algorithm based on the $\Phi_{k,m,n}$ obtained through the feedback channel. In addition, channel information of each antenna for each sub-carrier frequency is compared and a user signal is transmitted through an antenna having superior channel characteristics and frequency by using antenna selective diversity.

For example, if two users use two antennas, the four feedback channels $\Phi_{1,n,1}$, $\Phi_{1,n,2}$, $\Phi_{2,n,1}$, and $\Phi_{2,n,2}$ are formed with respect to $n^{th}$ sub-carrier. At this time, the number of sub-carriers $n_k$ to be allocated to each user is obtained by using an average of $\Phi_{k,n,1}$ and $\Phi_{k,n,2}$ corresponding to each user and the sub-carriers are allocated to an antenna representing the superior channel characteristic.

If the conventional signal antenna system is used for multi-users, only a channel characteristic for a single antenna may exist when allocating the sub-carriers, so a diversity effect cannot be obtained. That is, as the number of antennas increases, the probability of inferior channel characteristic in all channels decreases, so the diversity effect can be improved and an error rate can be reduced. In addition, a probability of null creation can be reduced so that a data transmission rate can be improved.

Hereinafter, an apparatus and a method for allocating sub-carriers to each user in a MIMO OFDMA scheme according to a first embodiment of the present invention will be described.

Figure 2:
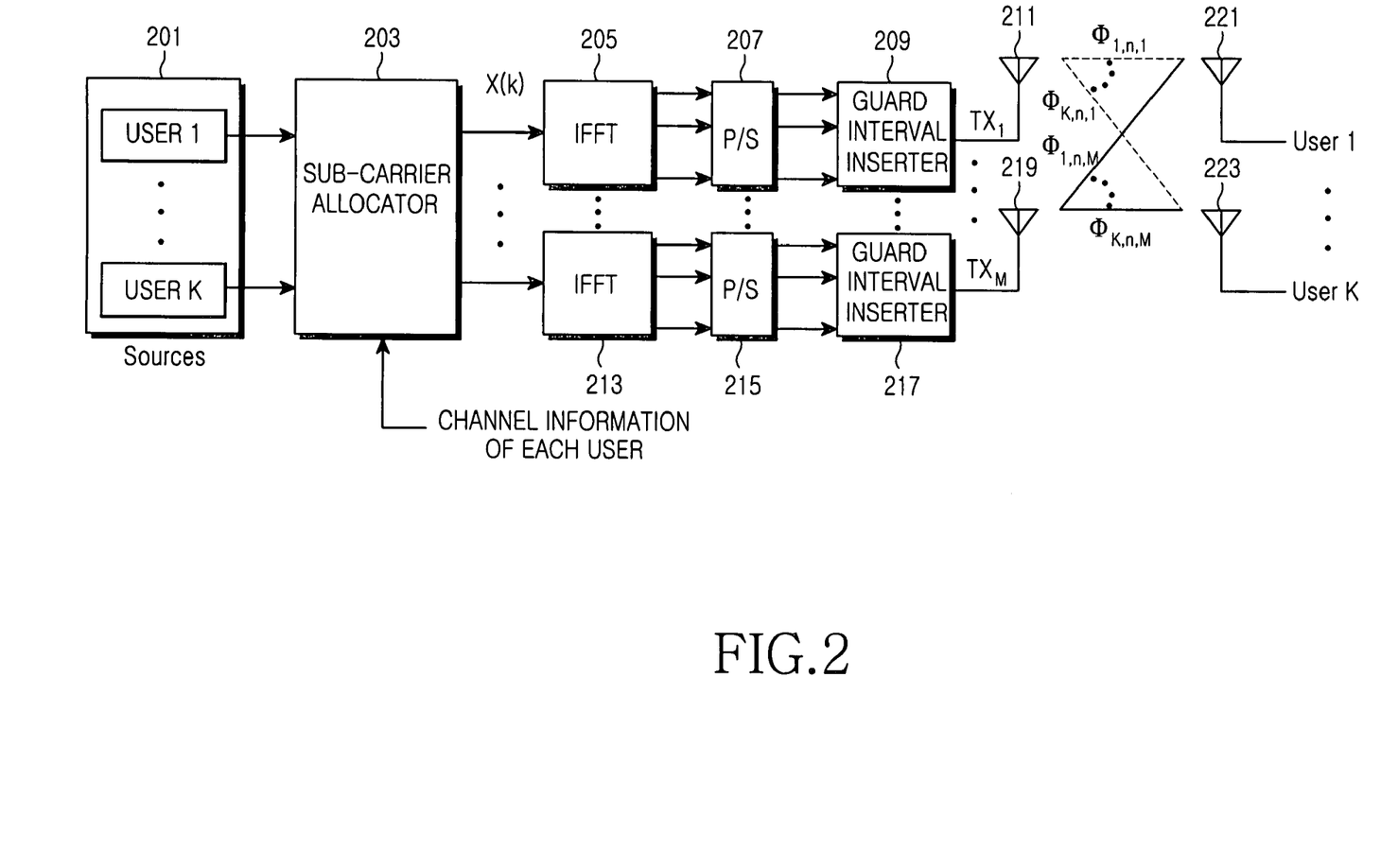
FIG. 2 is a block diagram illustrating a structure of a multi-input multi-output (MIMO) OFDMA system according to a first embodiment of the present invention.

FIG. 2 is a block diagram illustrating a structure of a MIMO OFDMA system for transceiving data by allocating sub-carriers according to a first embodiment of the present invention.

Referring to FIG. 2, data for K users 201 are allocated to predetermined antennas and sub-carriers through a sub-carrier allocator 203 based on channel information per each user. Thus, the sub-carriers are transmitted according to allocation information of sub-carriers through Inverse Fast Fourier Transforms (IFFTs) 205 and 213, guard interval inserters 207 and 215, parallel to serial converters 209 and 217 and antennas 211 and 219.

FIG. 2 illustrates an MIMO OFDM system including m transmission antennas and K users. In addition, N sub-carriers are used and an ASA scheme of a closed-loop transmit diversity is employed. A structure of the transmitter shown in FIG. 2 is substantially identical to the structure of the transmitter shown in FIG. 1. However, since different sub-carriers are allocated to each antenna in the MIMO system having multiple antennas, a procedure after the IFFT may be performed in each antenna. The conventional OFDMA system includes a single antenna structure so the sub-carrier is allocated to each user. However, the MIMO OFDM system must allocate the sub-carrier to each user and each antenna. The sub-carrier allocation algorithm by means of the sub-carrier allocator according to an embodiment of the present invention will be described later with reference to FIGS. 3 to 5.

In the meantime, M×K channels $\Phi_{1,n,1}$, $\Phi_{2,n,1}$, ... $\Phi_{K,n,1}$ ... $\Phi_{1,n,M}$, $\Phi_{2,n,M}$, ..., and $\Phi_{K,n,M}$ are formed between each transmission antenna 221 and 223 and each antenna. In addition, each channel has a channel response for N sub-carriers. When feedbacking the channel information from a receiver to a transmitter, N information included in each channel is transmitted, so K×M×N information is fed back. The structure of the receiver of each user is substantially identical to the structure of the receiver shown in FIG. 1, except that the receiver shown in FIG. 2 obtains the user signal by demodulating its own sub-carrier based on information related to the sub-carrier allocated by the sub-carrier allocator according to the an embodiment of the present invention.

Figure 3:
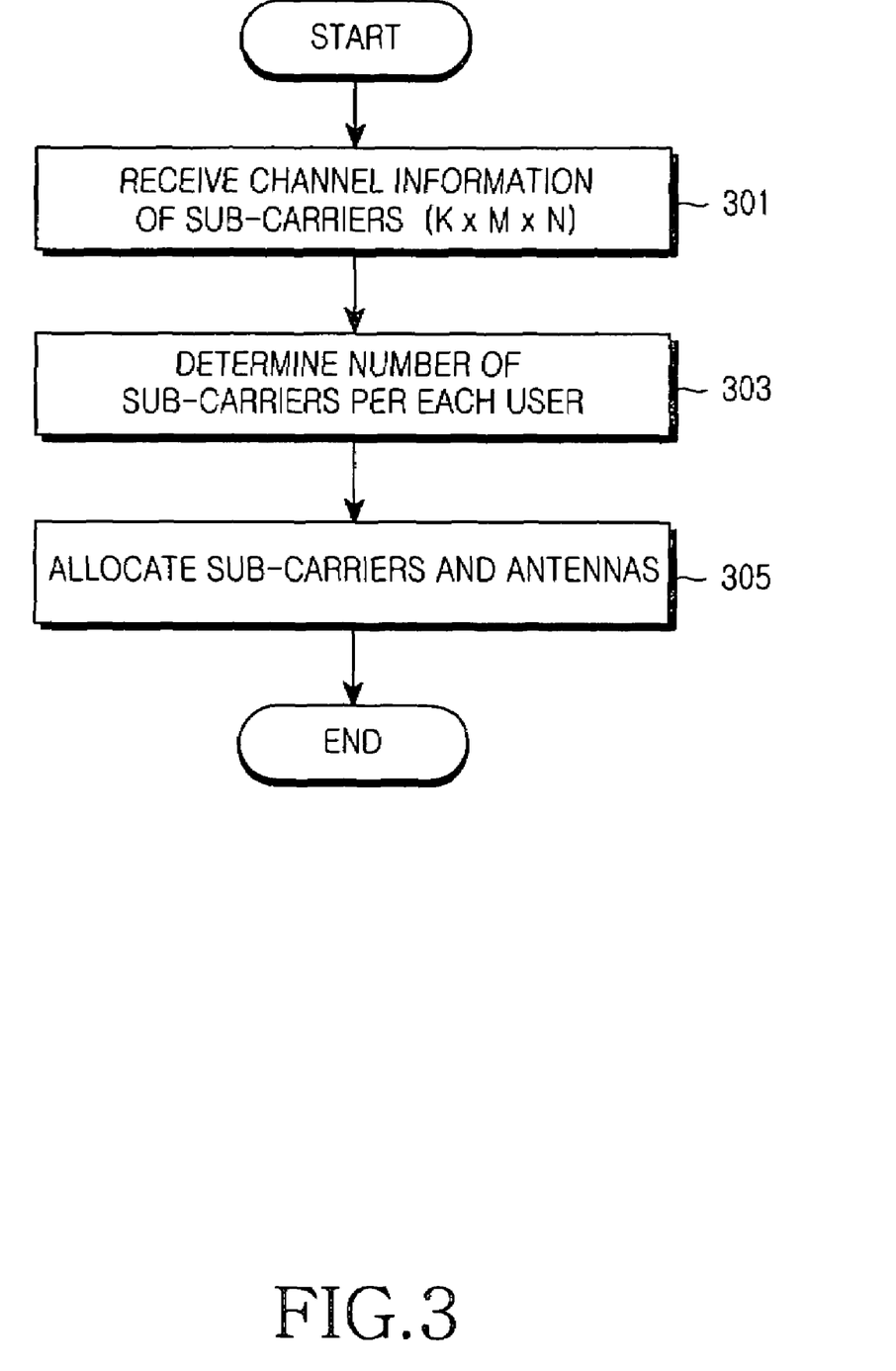
FIG. 3 is a flow chart illustrating a sub-carrier allocation procedure in a MIMO OFDM scheme according to a first embodiment of the present invention.

FIG. 3 is a flow chart illustrating a sub-carrier allocation procedure in a MIMO OFDM scheme according to a first embodiment of the present invention.

Referring to FIG. 3, a base station receives channel information related to sub-carriers per each antenna with respect to each user (step 301). As shown in Equation 1. an amount of the channel information is K×M×N, which corresponds to the number of channel information related to each sub-carrier for each user.

Then, the base station determines the number of sub-carriers for each user (step 303) and allocates the sub-carriers to users and antennas (step 305). At this time, sub-carriers must be allocated to each user by taking channel information of each antenna and each sub-carrier into consideration.

The method for allocating the sub-carrier according to the first embodiment of the present invention includes two steps of determining the number of sub-carriers to be allocated to each user and allocating the sub-carriers to each user and each antenna.

First step: determining the number of sub-carriers to be allocated to each user

In order to allocate the sub-carriers to each user and each antenna, it is necessary to determine the number of sub-carriers to be allocated to each user. The number $n_k$ of sub-carriers to be allocated to each user must be determined by taking the minimum bit rate $B_{min}(k)$ and the maximum transmission energy $E_{max}(k)$ into consideration. If the maximum transmission energy $E_{max}(k)$ is small, a desired bit rate cannot be obtained even if all sub-carriers are allocated to one user. In this case, it is necessary to reduce the bit rate or increase the transmission power. In addition, if the number of sub-carriers allocated to all users is less than or more than the number of the sub-carriers, it is necessary to adjust the maximum transmission energy or the number of sub-carriers by removing some of the sub-carriers.

The number $n_k$ of sub-carriers to be allocated to each user must be initially determined. At this time, an initial number $n_k$ of the sub-carriers is determined as represented in Equation 4.

$$n_k = \lfloor B_{min}(k)/b_{max} \rfloor \quad \text{Equation 4}$$

Referring to Equation 4, the initial number $n_k$ is determined such that the maximum bit number $b_{max}$ per each symbol can be applied to all sub-carriers and total transmission energy $E_T(k)$ per each user is determined through the initial number $n_k$ of sub-carriers, an average CNR and a minimum bit rate.

If the sum of sub-carriers allocated to each user is smaller than the total number of sub-carriers, transmission energy per each user is adjusted by using an extra sub-carriers, thereby increasing the number of sub-carriers to be allocated. That is, when the total transmission energy $E_T(k)$ per each user is larger than the maximum transmission energy $E_{max}(k)$, the number $n_k$ of sub-carriers is increased one by one so as to maintain the total transmission energy $E_T(k)$ below the maximum transmission energy $E_{max}(k)$. If the sum of the sub-carriers allocated to each user is smaller than the total number of the sub-carriers, the maximum transmission energy $E_{max}(k)$ is reduced.

In addition, if the sum of sub-carriers allocated to each user is larger than the total number of the sub-carriers, new transmission energy $E_{new}(k)$ is defined, in which the number of sub-carriers allocated to each user is reduced by one, thereby reducing the number of sub-carriers while minimizing an interval between the new transmission energy $E_{new}(k)$ and total transmission energy $E_T(k)$.

Second step: allocating sub-carriers to each user and each antenna

When allocating sub-carriers to each user, priority of users receiving the sub-carriers is very important. The priority includes reference priority and actual priority.

The reference priority can be defined as represented in Equation 5 based on the number of sub-carriers allocated to each user in step 1:

$$p(k) = \frac{n_k}{N}, \forall k \quad \text{Equation 5}$$

The actual priority can be defined as represented in Equation 6:

$$p(k) = \frac{n_k}{\sum_{k'=1}^{K} n_{k'}}, \forall k \quad \text{Equation 6}$$

Referring to Equation 6, the actual priority is determined while reducing the number of sub-carriers one by one ($n_k=n_k-1$) whenever each user receives the sub-carrier.

When the priority is determined according to the above method, sub-carriers, which have the best CNR and have not been allocated to other users, are allocated to a user k having the greatest number of sub-carriers, and then, the number of allocated sub-carriers is reduced one by one ($n_k=n_k-1$). In addition, a sub-carrier allocation matrix A including antennas for each user and sub-carriers is defined. Then, a sub-carrier component (that is, sub-carriers for a corresponding antenna) is set to 1. For instance, if two antennas are provided and the CNRs of channels in two antennas for the user k are $\Phi_{k,n,1}$ and $\Phi_{k,n,2}$, respectively, the sub-carriers are compared with each other based on the CNRs of the channels, thereby finding a sub-carrier n having the best CNR. At the same time, an antenna having a superior channel state is selected to transmit the signal.

When the sub-carrier allocation for the user having the greatest number of sub-carriers has been completed, the actual priority is re-calculated for all users so as to sequentially allocate sub-carriers to users, who have the greatest difference with respect to the reference priority, that is, who have a plurality of sub-carriers and sub-carrier allocation thereto that is delayed. Thus, among the remaining sub-carriers, sub-carriers having the best CNR and the sub-carrier allocation matrix A thereof is not "1" are allocated.

Hereinafter, the sub-carrier allocation procedure will be described in detail with reference to FIGS. 4 and 5.

Figure 4:
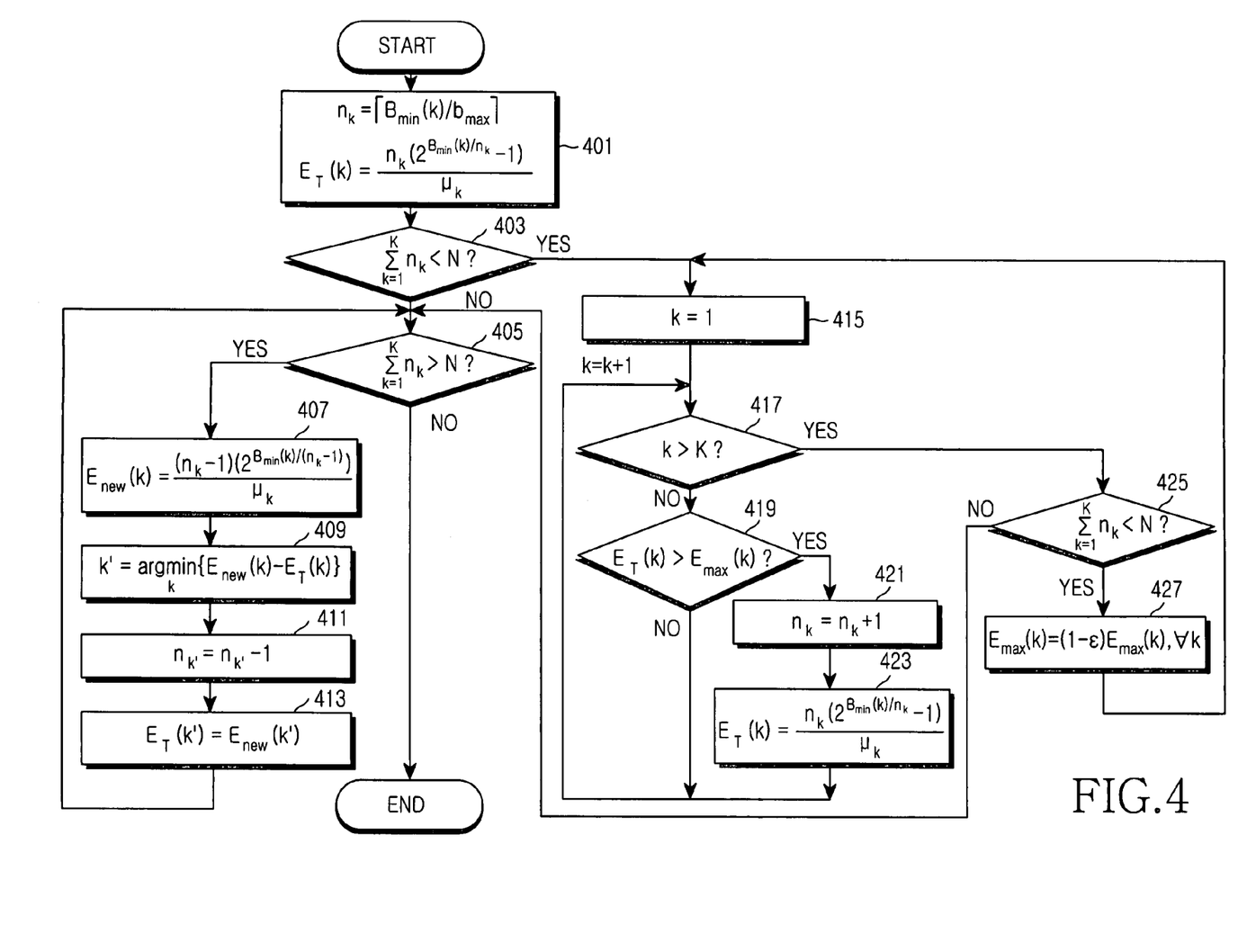
FIG. 4 is a flow chart illustrating a procedure for determining the number of sub-carriers to be allocated to each user according to a first embodiment of the present invention.

FIG. 4 is a flow chart illustrating a procedure for determining the number of sub-carriers to be allocated to each user according to a first embodiment of the present invention.

Referring to FIG. 4, the sub-carriers are properly allocated to each user according to feedback channel information based on a minimum transmission bit rate required by each user and maximum transmission energy.

In step 401, the number of sub-carriers for each user is initialized. A minimum sub-carrier $n_k$ is allocated to each user based on a minimum bit rate $B_{min}(k)$ required by each user and the total transmission energy $E_T(k)$ for each user is calculated.

Then, the sum of sub-carriers allocated to each user is compared with the total number N of sub-carriers (step 403). If the sum of sub-carriers allocated to each user is larger than the total number of the sub-carriers, the number of sub-carriers allocated to each user must be reduced. In addition, if the sum of sub-carriers allocated to each user is smaller than the total number of the sub-carriers, the sub-carriers must be further allocated to each user by using extra sub-carriers. If it is determined in steps 403 and 405 that the sum of sub-carriers allocated to each user is identical to the total number of the sub-carriers, it indicates that the sub-carrier allocation for each user has been completed, so the sub-carrier allocation procedure ends.

In addition, if it is determined in step 403 that the sum of sub-carriers allocated to each user is smaller than the total number of the sub-carriers, it is necessary to increase the number of the sub-carriers one by one until total transmission energy for each user does not exceed maximum energy allocated to each user. That is, a value of a user k is set to 1 in step 415, and it is determined whether the number of sub-carriers is increased in step 417.

Then, in step 419, if the total transmission energy $E_T(k)$ for the user k is smaller than the maximum transmission energy $E_{max}(k)$, the number of sub-carriers for the user k is not increased. In addition, if the total transmission energy $E_T(k)$ for the user k is larger than the maximum transmission energy $E_{max}(k)$, the number of sub-carriers allocated to the user k is increased by one ($n_k=n_k+1$) in step 421. That is, if the total transmission energy $E_T(k)$ for the user k is larger than the maximum transmission energy $E_{max}(k)$, the number of sub-carriers allocated to the user k is increased, thereby preventing the total transmission energy $E_T(k)$ for the user k from exceeding the maximum transmission energy $E_{max}(k)$. After that, the total transmission energy $E_T(k)$ is calculated in relation to the increased sub-carriers in step 423. The above steps are repeatedly carried out with respect to each user.

If it is determined in step 417 that the sub-carrier allocation procedure for each user has been completed, it is again determined whether the sum of sub-carriers allocated to each user exceeds the total number of sub-carriers (step 425). If the sum of sub-carriers allocated to each user is smaller than the total number of sub-carriers although the number of sub-carriers allocated to each user is increased through the above procedure, that is, when the extra sub-carriers are added, a maximum energy to be allocated to each user, that is, the maximum transmission energy $E_{max}(k)$ for each user is reduced by a predetermined value in step 427. After that, the sub-carrier allocation increase procedure is repeatedly carried out with respect to each user. That is, if some sub-carriers, which can be allocated to users, still remain although the sub-carriers have been further allocated to each user in order to prevent the total transmission energy from exceeding the maximum transmission energy $E_{max}(k)$, the maximum transmission energy $E_{max}(k)$ for each user is set to a smaller value so as to further allocate the sub-carriers to each user. Thus, the maximum transmission energy $E_{max}(k)$ can be continuously reduced by a predetermined value until all sub-carriers have been allocated to each user.

In contrast, if it is determined in steps 403 and 405 that the sum of the sub-carriers allocated to each user is larger than the total number of sub-carriers, the number of sub-carriers allocated to each user is continuously reduced through steps 407 to 413. In step 407, the number of sub-carriers allocated to each user is reduced by one and new transmission energy $E_{new}(k)$ is calculated based on the sub-carriers allocated to each user. In step 409, users are aligned in the order of a gap difference between the new transmission energy $E_{new}(k)$ and the total transmission energy $E_T(k)$.

After that, the number of sub-carriers for a user having a least gap difference is reduced one by one in step 411. In step 413, the total transmission energy $E_T(k)$ becomes an energy value, which is obtained when the number of sub-carriers has been changed.

Accordingly, it is possible to effectively allocate the sub-carriers to each user by taking the maximum transmission energy for each user into consideration.

Figure 5:
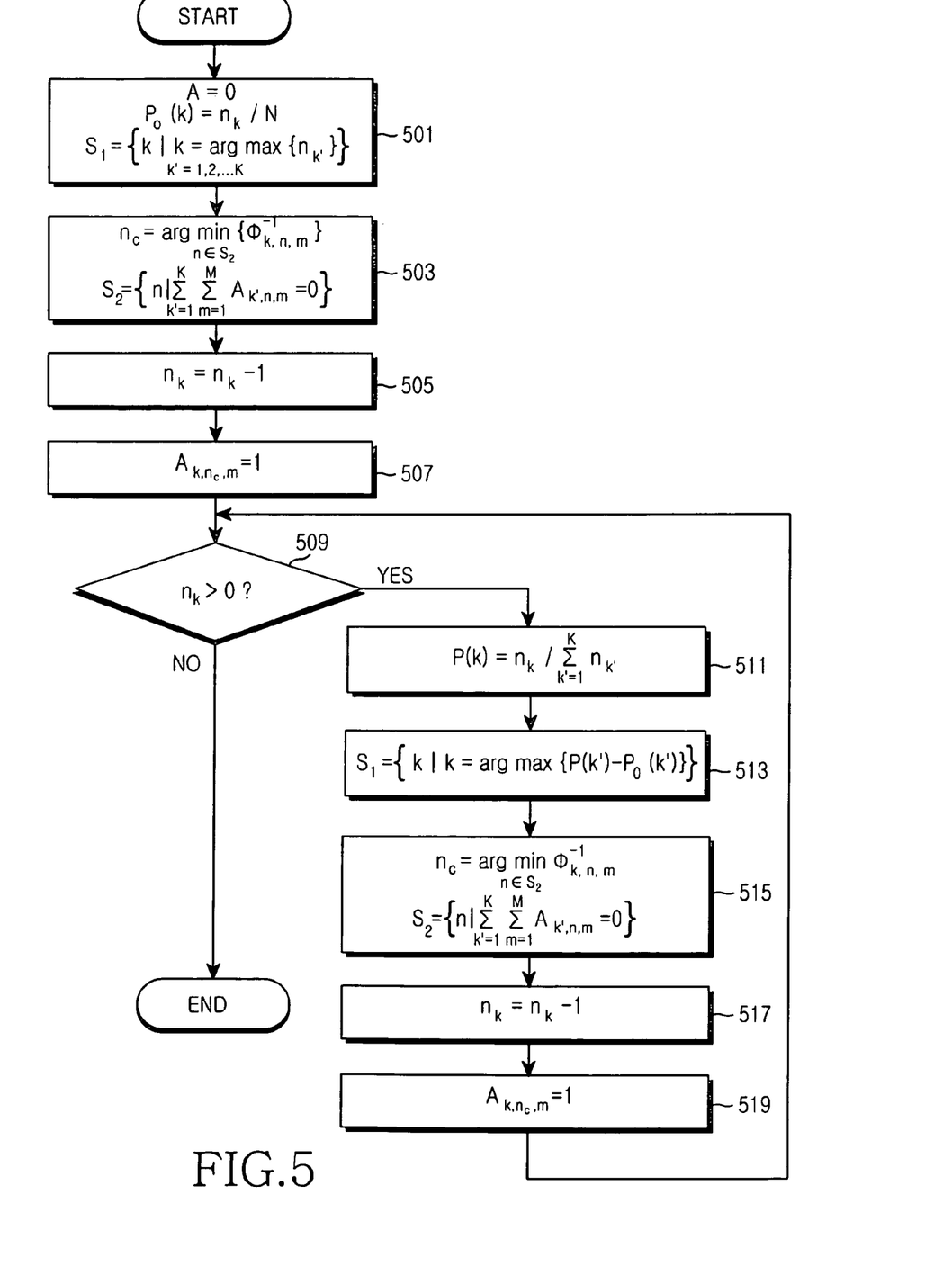
FIG. 5 is a flow chart illustrating a procedure for determining an antenna and a sub-carrier for each user according to a first embodiment of the present invention.

If the number of sub-carriers to be allocated to each user has been determined, the sub-carriers are allocated to each user and each antenna according to a predetermined procedure shown in FIG. 5.

FIG. 5 is a flow chart illustrating a procedure for allocating sub-carriers and antennas to each user according to a first embodiment of the present invention.

Referring to FIG. 5, a sub-carrier allocation matrix $A_{k,n,m}$ is set to "0" at step 501. The sub-carrier allocation matrix A indicates a use of the sub-carrier in each antenna per each user k. In addition, in order to allocate the sub-carriers, the reference priority $P_0(k)$ is calculated based on Equation 5, and a set $S_1$ of sub-carriers, in which the sub-carriers are aligned in an order of an $n_k$ value, is determined, thereby selecting a user having the greatest number of sub-carriers to be allocated thereto.

Then, in step 503, $\Phi^{-1}_{k,n,m}$ is obtained by using feedback channel information of a $k^{th}$ user, and a sub-carrier n and an antenna m having a minimum value are searched. Subsequently, a value of $n_k$ is reduced by one in step 505, and $A_{k,n,m}$ corresponding to the sub-carrier and the antenna searched from the sub-carrier allocation matrix A is changed to "1" in step 507.

Thereafter, it is checked whether allocation for all sub-carriers has been completed in step 509. If the sub-carrier to be allocated to users still remain, the actual priority is calculated according to Equation 6 in step 511. Then, in step 513, a user having the greatest differential value between the actual priority and the reference priority is selected. In addition, after obtaining $\Phi^{-1}_{k,n,m}$ by using feedback channel information of the selected user, a sub-carrier n and an antenna m having a minimum value are searched in step 515. After that, a value of $n_k$ is reduced by one in step 517, and $A_{k,n,m}$ corresponding to the sub-carrier and the antenna searched from the sub-carrier allocation matrix A is changed to "1" in step 519. Such a procedure is repeatedly performed until $n_k$ becomes "0", so all sub-carriers can be allocated to each user and each antenna.

Embodiment 2

Hereinafter, an apparatus and a method for allocating sub-carriers according to a second embodiment of the present invention will be described with reference to FIGS. 6 and 7.

First, a structure of a transmitter in a MIMO OFDMA system according to a second embodiment of the present invention will be described with reference to FIG. 6. Referring to FIG. 6, user data are converted into parallel data by means of a serial to parallel converter 601 and is divided into at least one sub-carrier group 605 and 607 by means of a group allocator 603. If the group is allocated in a sub-carrier unit, a group size L=1. A plurality of sub-carriers are combined as one group.

Such a group allocation is performed by means of a group allocation controller 611 according to channel information received from receivers 617 and 619. The group is allocated while taking a channel state of the sub-carrier in each antenna per each user into consideration. The sub-carriers of each group is multiplied by a predetermined phase, and then, the sub-carriers are combined with each other in each group. The signals processed based on group allocation information of the group allocation controller 611 are allocated to a plurality of antennas 613 and 615 by means of an antenna allocator 609.

Figure 6:
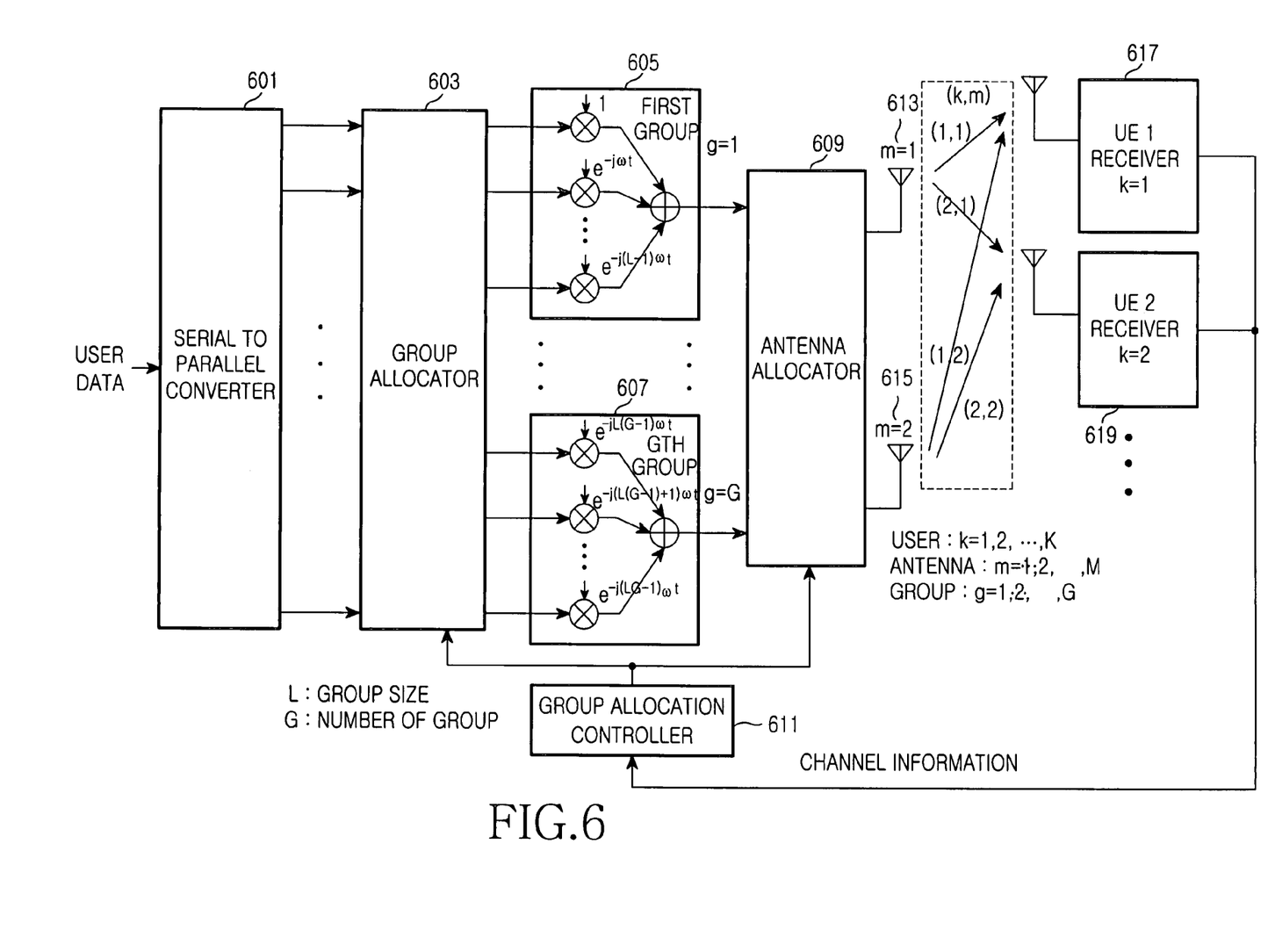
FIG. 6 is a block diagram illustrating a structure of a MIMO OFDM system according to a second embodiment of the present invention.

In FIG. 6, if the number of antennas is M and the number of sub-carriers is N, a transmission signal is represented as Equation 7:

$$s(t) = \frac{1}{\sqrt{N}} \sum_{i=-\infty}^{\infty} \sum_{n=0}^{N-1} d_n g(t - iT_s) e^{-j2\pi n \Delta f i} \quad \text{Equation 7}$$

In Equation 7, $T_s$ is a length of a symbol interval, $d_n$ is a quadrature amplitude modulation (QAM) data symbol and g(t) is a rectangular filter. In addition, $\Delta f$ is a frequency interval between sub-carriers and is represented as Equation 8:

$$\Delta f = \frac{\omega_n - \omega_{n-1}}{2\pi}, n = 1, 2 \ldots, N-1 \quad \text{Equation 8}$$

If an $n^{th}$ sub-carrier is allocated to a $k^{th}$ user and transmitted through an $m^{th}$ transmit antenna, a transmission signal $s^{(m)}(t)$ transmitted through the $m^{th}$ transmit antenna is represented as Equation 9:

$$s^{(m)}(t) = \frac{1}{\sqrt{N}} \sum_{i=-\infty}^{\infty} \sum_{n=0}^{N-1} \sum_{k=1}^{K} \chi_{k,m,n} d_n^{(m)} g(t - iT_s) e^{-j2\pi n \Delta f t} \quad \text{Equation 9}$$

In Equation 9. $\chi$ is an allocation indicator indicating allocation of the sub-carrier. If an $n^{th}$ sub-carrier is allocated to a $k^{th}$ user and transmitted through an $m^{th}$ transmit antenna, $\chi_{k,m,n}=1$.

At this time, the sub-carrier allocation is determined according to a sub-carrier allocation algorithm and the sub-carrier allocation procedure is effectively performed in the base station by using feedback channel information, that is, a channel quality indicator (CQI) transmitted to the base station from user equipments. A signal to interference power ratio (SIR) is used in order to create CQI information.

Specifically, an $n^{th}$ sub-carrier is allocated to a $k^{th}$ user and the SIR of a channel of an $m^{th}$ antenna is $\rho_{k,m,n}$, a CQI bit is created based on the above SIR value. According to the an embodiment of the present invention, information is transmitted to each group, an average CQI value can be obtained as represented in Equation 10:

$$\overline{\rho}_{k,m}^{(g)} = \sum_{n=L(g-1)}^{Lg-1} \rho_{k,n,m}, g = 1, 2, \ldots G \quad \text{Equation 10}$$

In the meantime, the average CQI value obtained through Equation 10 can be quantized into Q information as shown in Equation 11:

$$\lambda_{k,n}^{(g)} \begin{cases} 0, & \text{if } \rho_{k,m}^{(g)} < \eta_0 \\ q, & \text{if } \eta_{q-1} < \rho_{k,m}^{(g)} \leq \eta_q \\ Q-1, & \text{if } \rho_{k,m}^{(g)} > \eta_{Q-2} \end{cases} \quad \text{Equation 11}$$

In Equation 11, $\eta_{Q-2} > \ldots > \eta_1 > \eta_0$ is a threshold value for classifying a CQI grade and the SIR value is quantized into Q information based on the threshold value. Channel quality is improved as the value of the CQI increases. If $\lambda_{k,m}^{(g)}$ is a channel used for resource allocation with a high SIR, the allocation indicator $\chi$ can be represented as Equation 12:

$$\chi_{k,m,g(L-1)} = \chi_{k,m,g(L-1)+1} = \cdots = \chi_{k,m,gL} = 1 \quad \text{Equation 12}$$

As mentioned above, according to the second embodiment of the present invention, the SIR information is estimated per each group in a user equipment and the estimated CQI information is quantized and transmitted to the base station. Upon receiving the quantized channel information, the base station determines a proper allocation indicator value according to a predetermined sub-carrier allocation algorithm of the present invention.

Hereinafter, an algorithm for allocating the sub-carriers per each group by using the CQI information received in the base station will be described with reference to FIG. 7. The sub-carrier allocation algorithm is carried out according to two rules. Preferably, sub-carrier allocation algorithm is periodically carried out according to a channel state.

Prior to explaining FIG. 7, parameters used in the present invention will be described. In the following description, M is the number of transmit antennas, and N is the number of sub-carriers. In addition, k is a user, g is a sub-carrier group, m is an antenna. $R_{min}(k)$ is a minimum bit rate required by each user equipment, and $B_{min}(k)$ is a minimum bit rate required for each user equipment. In addition, $B_d(k)$ is a desired bit rate. The $R_{min}(k)$ and $R_d(k)$ are temporary parameters used in the algorithm. Such parameters are updated as one sub-carrier is allocated.

The sub-carrier allocation according to the second embodiment of the present invention is determined by taking the minimum bit rate $R_{min}(k)$ required by the user k into consideration. In addition, $\lambda^{(g)}_{k,m}$, which is a CQI value of an $m^{th}$ antenna when a $g^{th}$ sub-carrier is allocated to a $k^{th}$ user, must be considered. That is, the sub-carrier having high $\lambda^{(g)}_{k,m}$ is allocated.

In addition, after the bit rate is basically allocated to each user, high quality SIR (that is, $$\overline{\rho^{(g)}_{k,m}})$$

must be selected. Herein, the high quality SIR means that $\lambda^{(g)}_{k,m} \geq$ th (predetermined threshold value).

Figure 7:
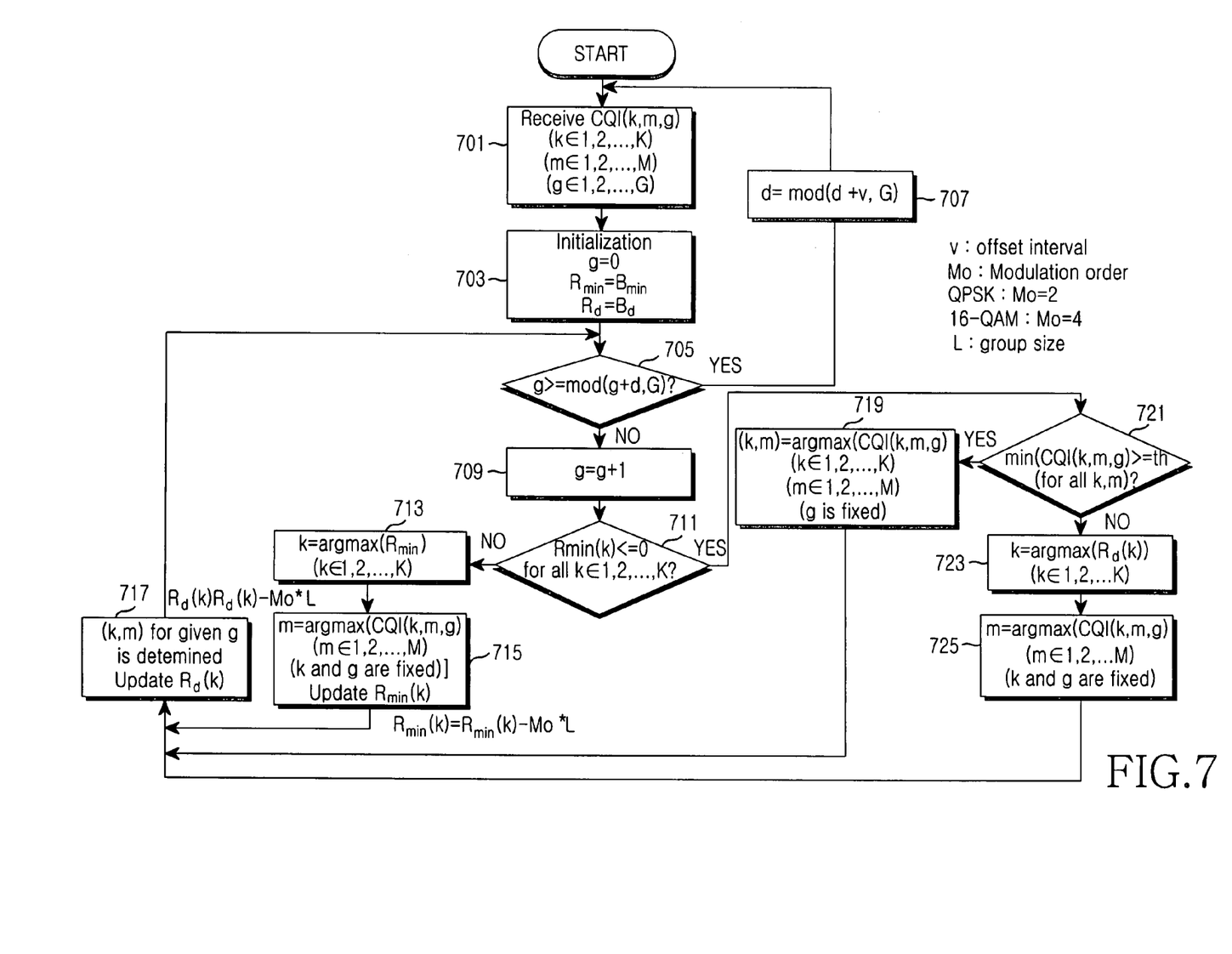
FIG. 7 is a flow chart illustrating a procedure for allocating a sub-carrier for each user according to a second embodiment of the present invention.

Referring to FIG. 7, the base station receives CQI information in relation to sub-carrier groups and antennas per each user in step 701. In addition, g, $R_{min}$ and $R_d$ are initialized in step 703. If a value of g is larger than mod(g+d,G) in step 705, a value of d is reset to mod(d+v)G in step 707. Otherwise, a group allocation procedure is performed while increasing a value of g one by one in step 709. At this time, the value of d is an offset value for allocating the sub-carriers from different positions for the purpose of random resource allocation.

Then, the minimum bit rate $R_{min}(k)$ is checked for all user k in step 711. If the minimum bit rate $R_{min}(k)$ is larger than "0", step 713 is performed. In step 713, the users are realigned in the order of the minimum bit rate $R_{min}(k)$. In step 715, the CQI value is determined while fixing the values of k and g, thereby determining a maximum value of m and updating the minimum bit rate $R_{min}(k)$. In step 717, (k,m) for a given g is finally determined and the $R_d(k)$ is updated. Thus, the $g^{th}$ sub-carrier group is mapped with the $m^{th}$ antenna for the k user.

The $R_d(k)$ is a data rate required by each user. The $R_{min}(k)$ and $R_d(k)$ are temporary parameters which are used in a sub-carrier determination procedure. The above parameters are continuously updated whenever the sub-carrier is allocated. In addition, the above allocation procedure is sequentially carried out one by one with respect to sub-carriers (or groups). If (k,m)=(a,b) is determined at the $g^{th}$ sub-carrier, the allocation indicator is represented as Equation 13:

$$\psi_{k,m,g} \begin{cases} 1, & \text{for } k = a, m = b \\ 0, & \text{otherwise} \end{cases} \quad \text{Equation 13}$$

In the meantime, if it is determined in step 711 that the minimum bit rate $R_{min}(k)$ is smaller than "0", step 721 is carried out. In step 721, if a minimum value of the CQI for all k,m is larger than a predetermined threshold value (th), g is fixed in step 719. In addition, (k,m) ensuring maximum CQI with respect to all k,m is allocated for the g. In contrast, if the minimum value of the CQI for all k,m is smaller than the predetermined threshold value (th) in step 721, a value of k ensuring a maximum Rd is determined in step 723, and values of k and g are fixed in order to determine the value of m having the maximum CQI in step 725.

Thus, an efficient allocation procedure can be performed by using sub-carriers (groups) transmitted from plural users and CQI for each antenna.

Simulation test result according to an embodiment of the present invention

Hereinafter, a simulation test result of the present invention will be described with reference to FIG. 8.

Test environment for the simulation test is as follow:

The test is performed through link-level simulation and performance is checked based on bit error rate (BER). In addition, ITU Veh. a model is used for a channel environment, total paths are six, moving speed is 30 km/h (Doppler frequency=55 Hz), and fading uses Jakes model. ½ convolution coding and QPSK modulation is performed with regard to the user signal, and 512 sub-carriers are utilized. The sub-carrier allocation algorithm test is performed with regard to two users and two transmit antennas while setting a minimum data rate of each user to 300 and a maximum transmission energy to 30 dB.

Figure 8:
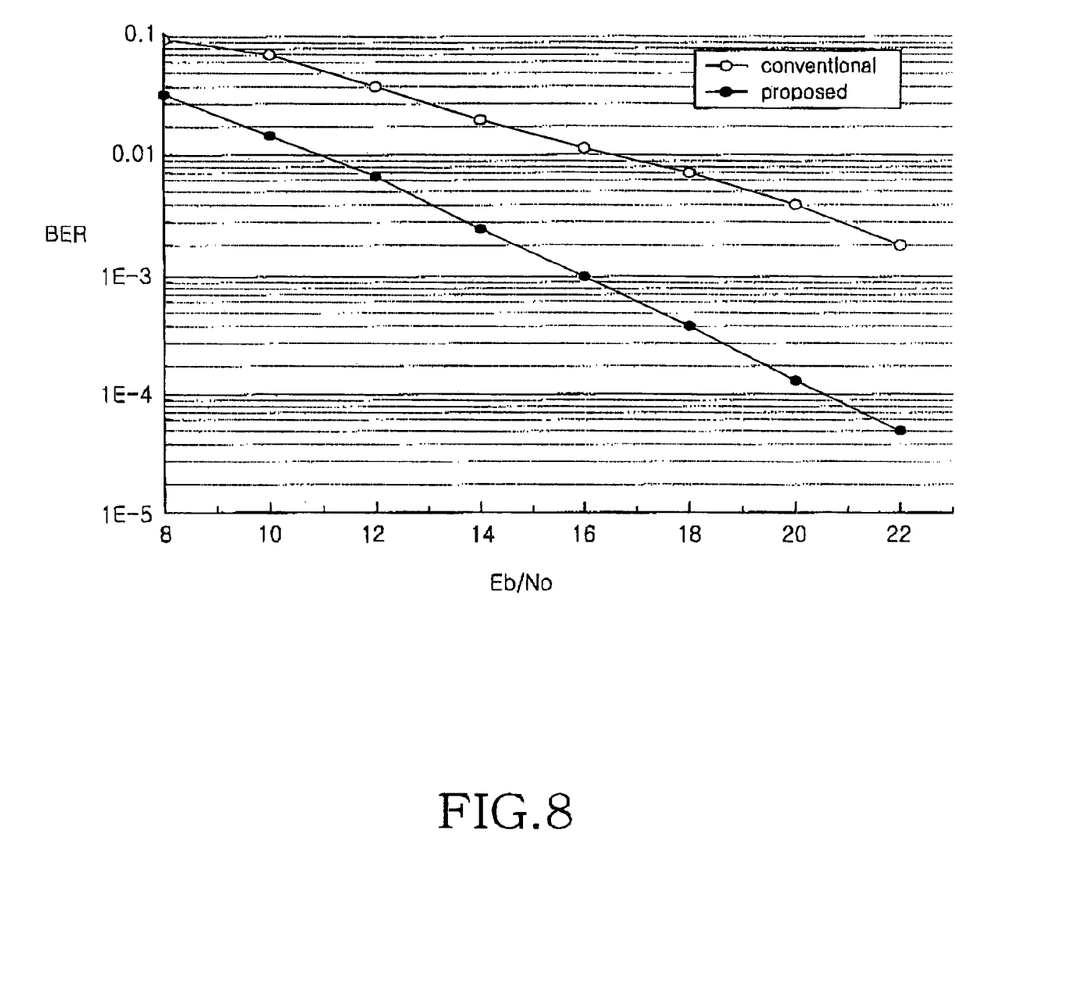
FIG. 8 is a graph illustrating a test result of the present invention.

The simulation test result is shown in FIG. 8. A "conventional" line represents a test result of a conventional OFDM system including one user and one antenna, and a "proposed" line represents a test result according to an embodiment of the present invention utilizing the sub-carrier allocation algorithm. It is assumed that channel information for all sub-carriers transmitted from each user is accurate.

As can be understood from FIG. 8, the proposed scheme represents superior performance as compared with the conventional OFDM scheme. When BER is 0.01, the proposed scheme improves performance by 6 dB as compared with the conventional OFDM scheme. Therefore, when the sub-carrier allocation algorithm is used, the performance of the mobile communication system can be improved due to the transmit antenna diversity effect.

While the invention has been shown and described with reference to certain embodiments thereof, it should be understood by those skilled in the art that various changes in form and details may be made therein without departing from the spirit and scope of the invention as defined by the appended claims.

What is claimed is:

1. A method of allocating sub-carriers to at least one user equipment and mapping the allocated sub-carriers with transmit antennas in a multi-input multi-output (MIMO) orthogonal frequency division multiplexing (OFDMA) mobile communication system, the method comprising the steps of:
   receiving channel information relating to the sub-carriers and the transmit antennas from a plurality of user equipments;
   determining a number of the sub-carriers to be allocated to each user equipment based on the channel information; and
   allocating, in a sub-carrier allocator of the MIMO OFDMA mobile communication system, each of the sub-carriers to each user equipment and mapping the allocated sub-carriers to the transmit antennas according to the channel information and the number of sub-carriers;
   wherein, if a sum of the sub-carriers allocated to each user equipment exceeds a total number of sub-carriers, a number of sub-carriers allocated to a user equipment which has a least gap difference between its new total energy calculated when the number of sub-carriers is reduced by one and its current total energy is reduced.

2. The method as claimed in claim 1, wherein the number of sub-carriers allocated to each user equipment is determined based on a minimum bit rate required for each user equipment.

3. The method as claimed in claim 1, wherein, if the number of sub-carriers allocated to each user equipment is less than the total number of sub-carriers, a maximum energy for each user equipment is reduced and a step of determining the number of sub-carriers allocated to each user equipment is repeated.

4. The method as claimed in claim 1, wherein allocating each of the sub-carriers to each user equipment and mapping the allocated sub-carriers to the transmit antennas is determined according to a predetermined priority of the user equipment.

5. The method as claimed in claim 4, wherein the predetermined priority of the user equipment is determined according to the number of sub-carriers to be allocated to each user equipment.

6. The method as claimed in claim 1, wherein, during the allocating step, each of the sub-carriers is allocated for a greatest channel gain to noise ratio.

7. An apparatus for allocating sub-carriers to at least one user equipment and mapping the allocated sub-carriers with transmit antennas in a multi-input multi-output (MIMO) orthogonal frequency division multiplexing (OFDMA) mobile communication system, the apparatus comprising:
a sub-carrier allocator for determining a number of the sub-carriers to be allocated to each user equipment based on channel information relating to the sub-carriers and the transmit antennas from a plurality of user equipments, and allocating each of the sub-carriers to each user equipment and mapping the allocated sub-carriers to the transmit antennas according to the channel information and the number of sub-carriers;
wherein, if a sum of the sub-carriers allocated to each user equipment exceeds a total number of sub-carriers, a number of sub-carriers allocated to a user equipment which has a least gap difference between its new total energy calculated when the number of sub-carriers is reduced by one and its current total energy is reduced.

8. The apparatus as claimed in claim 7, wherein the number of sub-carriers allocated to each user equipment is determined based on a minimum bit rate required for each user equipment.

9. The apparatus as claimed in claim 7, wherein, if the sum of the sub-carriers allocated to each user equipment is less than the total number of sub-carriers, a maximum energy for each user equipment is reduced and the step of determining the number of sub-carriers allocated to each user equipment is repeated.

10. The apparatus as claimed in claim 7, wherein allocating each of the sub-carriers to each user equipment and mapping the allocated sub-carriers to the transmit antennas is determined according to a predetermined priority of the user equipment.

11. The apparatus as claimed in claim 10, wherein the predetermined priority of the user equipment is determined according to the number of sub-carriers to be allocated to each user equipment.

12. The apparatus as claimed in claim 7, wherein, during the allocating step, each of the sub-carriers is allocated for a greatest channel gain to noise ratio.

13. A method of allocating sub-carriers to at least one user equipment and mapping the allocated sub-carriers with transmit antennas in a multi-input multi-output (MIMO) orthogonal frequency division multiplexing (OFDMA) mobile communication system using a modulation scheme, the method comprising the steps of:
dividing sub-carriers into several sub-carrier groups and receiving channel information related to the sub-carrier groups and the transmit antennas from a plurality of user equipments; and
allocating, by a group allocator, a sub-carrier group to a user equipment and mapping the allocated sub-carrier group to a transmit antenna according to whether the sub-carrier group has a superior channel state with respect to the user equipment and the transmit antenna;
wherein the allocated sub-carrier group is allocated to a user equipment having the largest minimum required bit rate and mapped to a transmit antenna having the largest channel quality indicator while the required minimum bit rate of the allocated user equipment is reduced by a value equal to a modulation order of the modulation scheme multiplied by a total number of subcarriers contained in the allocated sub-carrier group if the minimum required bit rates by all users are larger than 0.

14. The method as claimed in claim 13, wherein the channel information has a value obtained through quantizing a signal to interference power ratio of a channel by means of a predetermined threshold value.

15. The method as claimed in claim 13, wherein the allocation step is repeatedly carried out with each repetition being carried out a predetermined interval.

16. The method as claimed in claim 13, wherein a sub-carrier group and a transmit antenna having a signal to interference power ratio larger than a predetermined threshold value are primarily allocated.

17. An apparatus for allocating sub-carriers to at least one user equipment and mapping the allocated sub-carriers with transmit antennas in a multi-input multi-output (MIMO) orthogonal frequency division multiplexing (OFDMA) mobile communication system using a modulation scheme, the apparatus comprising:
a group allocation controller for dividing sub-carriers into several sub-carrier groups and receiving channel information related to the sub-carrier groups and the transmit antennas from a plurality of user equipments so as to control sub-carrier group allocation and transmit antenna mapping;
a group allocator for allocating a sub-carrier group to a user equipment and mapping the allocated sub-carrier group to a transmit antenna according to whether the subcarrier group has a superior channel state with respect to the user equipment and the transmit antenna under a control of the group allocation controller; and
wherein the allocated sub-carrier group is allocated to a user equipment having the largest minimum required bit rate and mapped to a transmit antenna having the largest channel quality indicator while the required minimum bit rate of the allocated user equipment is reduced by a value equal to a modulation order of the modulation scheme multiplied by a total number of subcarriers contained in the allocated sub-carrier group if the minimum required bit rates by all users are lager than 0.

18. The apparatus as claimed in claim 17, wherein the channel information comprises a channel quality indicator value obtained through quantizing a signal to interference power ratio of a channel by means of a predetermined threshold value.

19. The apparatus as claimed in claim 17, wherein the group allocation controller repeatedly allocates sub-carrier groups with each repetition being carried out at a predetermined interval.

20. The apparatus as claimed in claim 17, wherein the group allocation controller primarily allocates a sub-carrier group and a transmit antenna having a maximum channel quality indicator value associated with the sub-carrier group that is larger than a predetermined threshold value, wherein the maximum channel quality indicator value is obtained through quantizing a signal to interference power ratio of a channel by means of a predetermined threshold value.

* * * * *